April 17, 1962 R. E. CROOKE 3,030,017
REVERSIBLE COUNTER
Filed Sept. 22, 1959 3 Sheets-Sheet 1
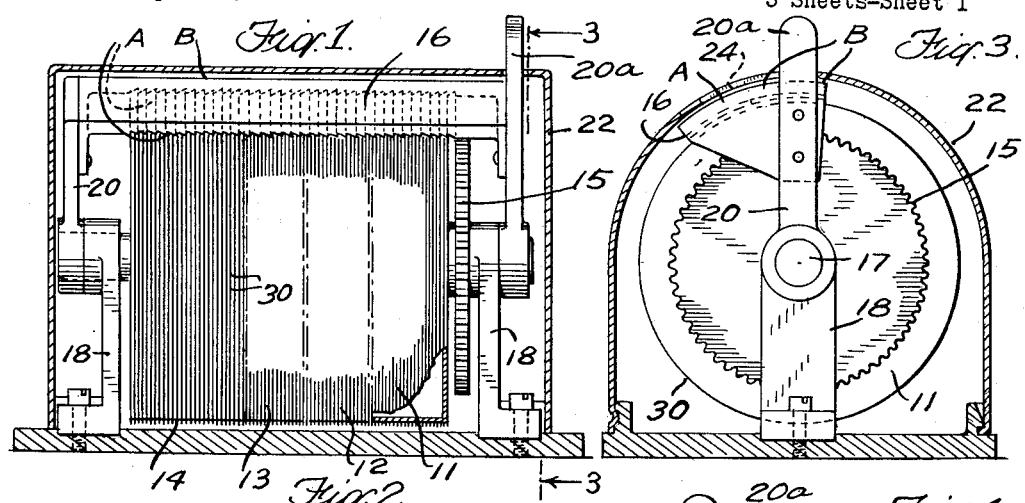
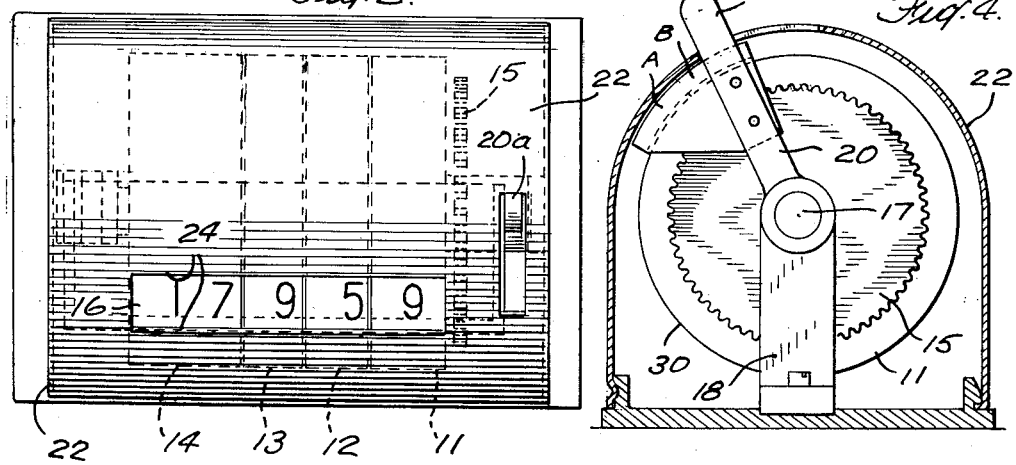
INVENTOR
RAYMOND E. CROOKE
BY
ATTORNEYS April 17, 1962 R. E. CROOKE 3,030,017
REVERSIBLE COUNTER
Filed Sept. 22, 1959 3 Sheets-Sheet 2
Fig. 7.
Fig. 7A.
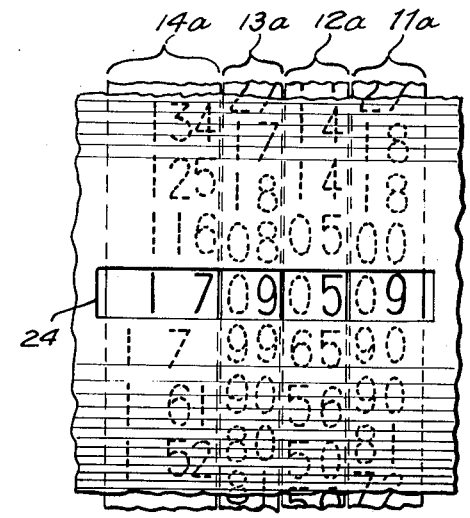
Fig. 7B.
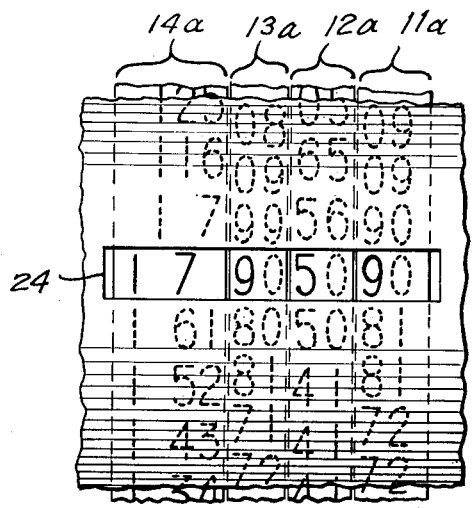
INVENTOR
RAYMOND E. CROOKE
BY
ATTORNEYS April 17, 1962
R. E. CROOKE
3,030,017
REVERSIBLE COUNTER
Filed Sept. 22, 1959
3 Sheets-Sheet 3
Fig. 8.
Fig. 9.
Fig. 9A.
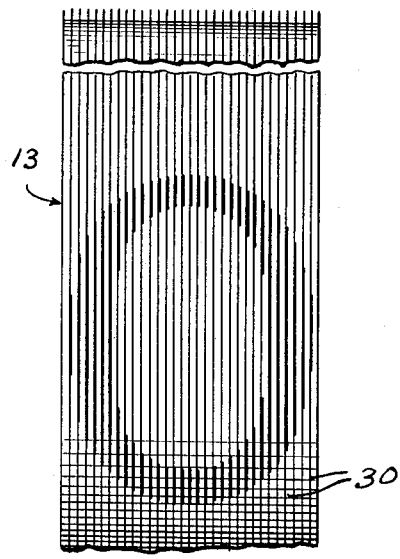
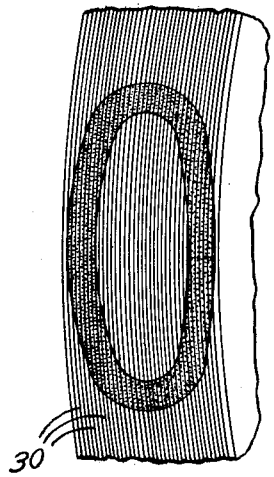
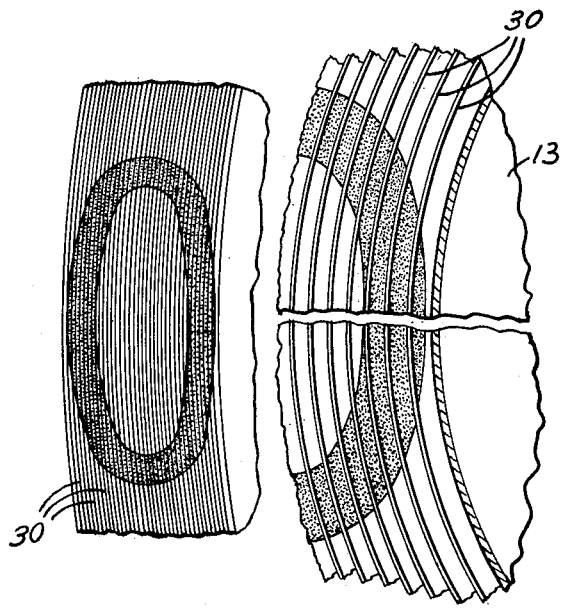
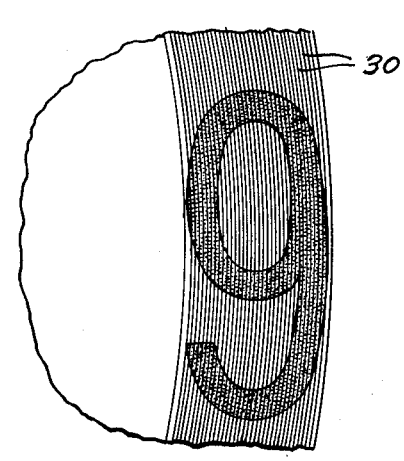
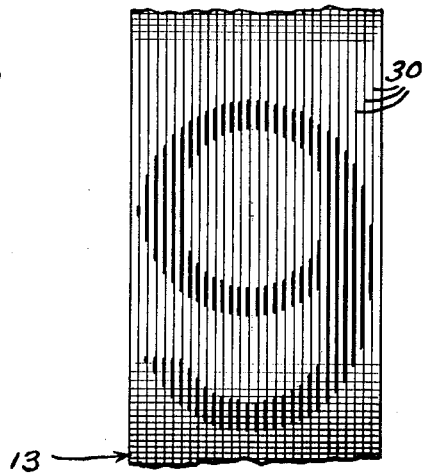
Fig. 11.
Fig. 10.
INVENTOR
RAYMOND E. CROOKE
BY Borst & Borst
ATTORNEYS United States Patent Office 3,030,017
Patented Apr. 17, 1962

3,030,017
REVERSIBLE COUNTER
Raymond E. Crooke, Roslyn, N.Y., assignor to Sperry Rand Corporation, Ford Instrument Company Division, Wilmington, Del., a corporation of Delaware
Filed Sept. 22, 1959, Ser. No. 841,606
3 Claims. (Cl. 235—117)

This invention relates to counters of the rotary drum type and particularly to such counters which are adapted at a given point to reverse the order of their numerical progression from an ascending to a descending order and vice versa.

An example of such a counter is a navigation position indicating counter used in the registering and visually indicating of positions of latitude and longitude by an instrument carried on a moving vehicle such as an airplane, whereby change in position is measured and computed in terms of latitude and longitude and the increments are fed into a counter. The operator needs to know not only the position in arcuate measurement but whether the position is in north or south latitude and in east or west longitude.

If the movement in a north and south direction continues past the equator, obviously the registering of the position in terms of latitude must change from a descending to an ascending scale. If the movement is in an east and west direction, then upon crossing the 180th meridian, for example, the counter must change from an ascending to a descending order of progression.

Counters operating in this manner are well known. Those in general use employ multiple rows of figures which are exposed in part and concealed in part by a movable mask. The counters operate continuously in one direction and the mask is shifted as the vehicle crossed the change-over line. The numbers then exposed will read progressively in reverse order. When the change-over line is at zero degrees of longitude or at the equator the reversal will be from a descending to an ascending order, and when the change-over line is at 180° of longitude or at 90° of latitude the reversal will be from an ascending to a descending order.

The drums of such counters have a minimum of two rows of numerals side by side on their cylindrical surfaces and in one well known form one drum has four rows of numerals. The drums must therefore be wide enough to accommodate the multiple rows of numerals.

It is a desideratum to keep the size and weight of airplane equipment to a minimum, and it is an object of this invention to effect a reduction in width of the drums without sacrifice of scope or legibility of inscribed indicia.

Another object is simplicity of construction and facility and dependability of operation. The invention has still other objects and advantages as will later appear.

The invention contemplates means whereby two series of numerals may occupy the same lateral space and may be differentiated by adjustable optical means which will selectively present the numerals of the two series to view. In the broad concept of the invention, an optical viewing screen is adjustable to alternative positions and selectively renders the two series of numerals visible in its respective positions. More specifically, it is contemplated that the numerals of two series will be inscribed or formed upon opposite sides of radial ribs on the cylindrical surface of the drum and a prismatic screen member having oppositely disposed prismatic areas be adjustable to bring the two areas selectively over the window or other area of observation to bring the numbers on one side or the other of the ribs into view. The numbers on one side will be in ascending sequence and those on the other side in descending sequence. The optical screen member will be shifted at the change-over line.

Other features of the invention will appear from the following description of the embodiment of the invention illustrated in the accompanying drawings.

FIG. 1 is a front elevation of a counter embodying the invention.
FIG. 1A is an enlarged plan of the fourth drum.
FIG. 2 is a plan of the counter.
FIG. 3 is an end view of the counter.
FIG. 4 is a view similar to FIG. 3 showing the prismatic screen adjusted to its alternative position.
FIGS. 5 and 6 are diagrammatic views illustrating the optical performance of the prismatic screen in its two positions of potential adjustment.
FIG. 7 is a diagrammatic representation of the numerical indicia appearing upon the respective drums, in which, for the purpose of explanation, columns of figures which in the illustrated counter are superposed in the same lateral space are here represented side by side.
FIG. 7A is a partial diagram of the numerical indicia similar to FIG. 7 but limited to the portion exposed through the window and the immediately associated areas and representing the correlation of the drums just prior to the instant of shifting at one change-over line.
FIG. 7B is a diagram similar to that of FIG. 7A but showing the arrangement after the shifting has occurred.
FIG. 8 is an enlarged fragmentary plan view of a portion of the periphery of one of the drums which is instantaneously exposed through the window or observation opening, assuming the absence of a screen and indicating the presence of a numeral on the right side of the ribs which becomes legible when the appropriate screen area is interposed.
FIG. 9 is a view of the same area as it appears through the appropriate prismatic screen.
FIG. 9A is an enlarged view of a portion of the area shown in FIG. 9.
FIG. 10 is a view similar to FIG. 8 showing the same portion of a drum periphery assuming the absence of a screen and indicating the presence of a numeral on the left side of the ribs which becomes legible when the appropriate screen area is interposed.
FIG. 11 is a view of the same area as it appears through the appropriate prismatic screen.

The counter is represented as having four drums, two of which register minutes of arc, one being the units and the other the tens register, and the other two of which register degrees, the first of the two other drums being the units register and the second the tens and hundreds register. Each denomination is represented by an ascending and a descending series of numbers, and therefore the first three drums have each two reversely progressing numerical series while the fourth drum has two pairs of reversely progressing series, one pair for the tens digits and the other pair for the hundreds digits.

The counter mechanism is of the general type and construction shown, for example, in Patents Nos. 2,605,- 047, 2,661,903 and 2,851,215. It is, therefore, unnecessary to illustrate and describe the mechanism in detail. The illustrated counter has four coaxial drums 11, 12, 13 and 14, the first of which, number 11, indicates the units of the minutes of arc and is directly connected for actuation to a gear 15 which is driven from a position computer (not shown).

Drum 12 indicates the tens denomination of the minutes of arc and is actuated in the usual way by transfer gearing (not shown) from drum 11 as the latter moves from the registration of nine to ten minutes.

Drum 13 indicates the units of degrees and is actuated in the usual way by transfer gearing (not shown) from drum 12 as drums 11 and 12 move from the registration of fifty-nine to sixty minutes of arc.

Drum 14 indicates the tens and hundreds digits of the degrees being instantaneously registered and is actuated in the usual way by transfer gearing (not shown) from drum 13 as the latter moves from the registration from nine to ten degrees.

The angular movement of each drum on actuation and the arrangement of the numbers in their various series are selected to effect the desired result, namely, the consecutive progression in one order to the change-over and then the reversal in order and the consecutive progression in that order as the counter mechanism continues to be driven in the same direction.

As shown particularly in FIGS. 8 through 11 and as will be later described more in detail, each drum has circumferentially on its periphery a plurality of rather closely spaced radial ribs and, of the two series of numerals, those of one series are inscribed on one side of the ribs and those of the other series are inscribed on the other side of the ribs. Optical means, namely, two prismatic screen areas with their prism bases relatively reversed are selectively disposed over the observed area of the drum faces so as to render one or the other of two numbers in that area apparent. In this way the two numbers are superposed in that they occupy the same lateral space.

The illustrated drum assembly employs the same number series as is used upon a counter in common use and which employs a mask of the type shown in Patent No. 2,661,903. This series of numbers is illustrated in FIG. 7. For the purpose of explanation, they are shown in this figure as disposed side by side as they are in the commercial counter, instead of being superposed as the present invention contemplates.

In FIG. 7, the column or table 11a represents the numbers in drum 11, table 12a those on drum 12, table 13a those on drum 13 and table 14a those on drum 14. The ten numerals on drum 11 are duplicated assuring that the number representing the last registered minute of arc will continue visible through the window until the next minute of arc is traversed and that numeral appears.

As will be seen, the numerals on drum 12 are triplicated and each step forward on actuation comprises a range of three numbers. Since this drum registers only six digits, the maximum register being sixty minutes as the transfer of the next drum 13 occurs to register the completed degree. In other words, as drum 11 moves forward from its registry of nine minutes to bring the numeral zero before the window drum 12 is moved forward one step which, as above stated, causes the third successive number to appear before the window.

The ten numerals in each series on drum 13 are successively duplicated, making twenty digits for each series in the complete circumference of the drum. The transfer ratio from drum 12 to drum 13 is such that the drum 13 is angularly moved 18° on each actuation which causes the first successive number to pass the window and brings the second successive number before the window. Thus there is prevented a void at the window at the time of transfer.

There are two pairs of numerical series on drum 14, each pair representing respectively the tens and the hundreds notation. One pair is in the first and third circumferential row and the other pair is in the second and fourth row. This fourth drum is therefore wider than the other three. The arrangement of the numbers is such as to effect the desired result, there being eighteen equally spaced transverse alined groups. The drum is actuated 20° or from one lateral group of numbers to the next on each step or transfer movement.

As the counter is viewed, the numerals at the right on the various drums are inscribed on the right side of the ribs and the numerals at the left are inscribed on the left side of the ribs, rows one and three on drum 14 being those on the right and rows two and four being those on the left.

As indicated in FIG. 1A, the ribs on drum 14 are in two groups numbered 14b and 14c, group 14b having the first and second rows of numerals shown in FIG. 7 inscribed respectively on the right and left sides of the ribs, and group 14c having the third and fourth rows of numerals inscribed respectively on the right and left sides of the ribs.

The optical system is represented diagrammatically in FIGS. 5 and 6. Disposed over the counter drums is a prismatic screen 16. This screen is shown as arcuate and pivoted on the axis 17 of the drums which is mounted in bearings in end brackets 18. The screen is carried by pivoted arms 20 and has alternate reversely disposed prismatic areas A and B, area A having prisms with bases right and area B having prisms with bases left, as indicated in FIGS. 5 and 6. The prism screen is shown as arcuate and comprising two areas but it is obvious that the screen could be a complete drum comparable to the mask of Patent 2,661,903 with alternate prismatic areas of a length equal to the angular adjustment of the screen.

Similarly the shifting of the screen can be effected automatically as is the mask of the said patent, but for simplicity it is shown as manually shifted. For this purpose, one of the arms 20 has a handle extension 20a which the operator uses in shifting the screen between the positions shown in FIGS. 3 and 4 to bring the areas A and B selectively into viewing position.

The instantaneous reading of the counter is observed through a window opening. In the form shown, the counter is contained with an opaque cover or housing 22 which has a slot to receive the handle 20a and across the drums it has an open slot constituting a window 24. The portions of the drum faces opposite the window are observed through the screen, either through area A or area B, depending on the adjustment of the screen.

As indicated by the lines of refraction of the rays of light in FIGS. 5 and 6, rays emanating from the right side of the ribs on the drums appear to the observer through screen section A, and rays emanating from the left side of the ribs appear to the observer through screen section B. This is indicated in FIGS. 8 through 11 to which reference is now made.

It will be assumed that the drum of which a portion is shown is drum 13. The closely spaced ribs are numbered 30. On the right side of the ribs in the segmental portion shown is inscribed the numeral zero which is indicated as a phantom in FIG. 8 by a thickening of the lines but which in the actual device is not thus visible. When observed through screen section A the right sides of ribs 30 are seen obliquely as though the drum were tilted to the position shown in FIGS. 9 and 9A and seen without a screen. It will be observed that in the phantom figure the side walls of the zero are wider than the end walls, but when viewed obliquely due to foreshortening the wall appears of the same width throughout.

FIG. 9A includes a portion of the right wall portion of the zero and on this scale is sufficiently detailed to show how a component portion of the numeral is inscribed on each rib and how the several components are visually merged when so viewed to make a composite numeral.

On the other side of the ribs is inscribed the numeral nine which is suggested in FIG. 10 by the double lines although again that is a phantom figure and it is obvious that the numeral is not visible in an edge on view of the ribs of the actual device.

In FIG. 11 is shown this section of the drum face as it appears through the screen section B, the width of the numeral being foreshortened and the wall again appearing of uniform width throughout.

FIG. 7A diagrammatically shows the reading of the counter just before the 180th degree of longitude is reached. In this case, it is assumed that it is East longitude and that the screen is adjusted as shown in FIG. 3 with section A in front of the window and the numerals which are being read are those on the right side of the ribs. The numerals on the left side of the ribs on drums 11, 12 and 13 are a zero in each case as is indicated by the dotted numerals in this figure and as appears from FIG. 7.

The continued driving of the counter in the same direction and the shifting of the screen meanwhile causes the same numerals to appear through the window, but in this case in West longitude. The continued driving of the counter in the same direction now causes the reading to continue through a descending scale. Having in mind that each drum actuates the next adjacent drum on every complete rotation; that drum 11 actuates drum 12 six times for a complete rotation of drum 12; that drum 12 actuates drum 13 ten times for a complete rotation; and that eighteen actuations of drum 14 effects a complete rotation of drum 14, the members can be followed through to ascertain that the numbers do follow in a descending sequence. For instance, it will be seen that the numeral exposed on drum 12 on the next actuation will be four, that the numeral next exposed on drum 13 will be eight and that the numerals next exposed on drum 14 will be one and six.

While the counter illustrated in the drawings and above particularly described is an acceptable embodiment of the invention, it will be understood that the invention may be otherwise embodied. For instance the ribs may extend axially or laterally of the drum faces and the prisms may be disposed with their opposing bases transverse of the faces. Various other changes will readily occur to those skilled in the art within the principle and scope of the invention as defined in the following claims.

What is claimed is:

1. A counter of the rotary drum type comprising at least one drum having on its cylindrical face at least two series of numerals in relatively reverse order, a cover for the drum having an opening exposing a limited area of the said face, and a transparent optical screen disposed in front of the opening and having two viewing areas which selectively and alternatively render one of the numerals opposite the opening visible to the exclusion of the other numeral, said optical screen comprising two prismatic areas with the bases of the prisms of the two areas disposed in relatively opposite directions, the screen being adjustable to bring the two viewing areas selectively opposite the opening.

2. A counter of the rotary drum type comprising at least one drum, a plurality of closely spaced ribs and at least two series of numerals in relatively reverse order disposed on the cylindrical face of said drum, one series of numerals being inscribed on one side of said ribs and the other series of numerals being inscribed in the other side of said ribs, a cover for said drum having an opening exposing a limited area of the said face, a transparent optical screen having two prismatic viewing areas with the bases of the prisms of the two areas disposed in relatively opposite direction, means adjustably mounting said screen adjacent said opening whereby said two viewing areas may be selectively brought into register with said opening, said viewing areas being operative to selectively and alternatively render numerals of one series of numerals visible to the exclusion of numerals of the other series of numerals.

3. A counter as defined in claim 2 in which the ribs are disposed circumferentially of the drum face and in which the bases of the prisms are disposed parallel with the ribs.

References Cited in the file of this patent
UNITED STATES PATENTS

| | | |
|---|---|---|
| 1,285,753 | Lowenstein | Nov. 26, 1918 |
| 2,813,679 | Heston | Nov. 19, 1957 |